Patented June 11, 1935

2,004,521

UNITED STATES PATENT OFFICE 2,004,521

CATALYTIC DEHYDRATION

Martin Mueller-Cunradi, Ludwigshafen-on-the-Rhine, and Ernst Ober, Mannheim, Germany, assignors to I. G. Farbenindustrie Aktiengesellschaft, Frankfort-on-the-Main, Germany No Drawing. Application April 1, 1931, Serial No. 527,052. In Germany April 9, 1930

5 Claims. (Cl. 260—171)

The present invention relates to chemical reactions in which organic compounds containing hydroxyl groups are subjected to catalytic dehydration.

It is already known that unsaturated hydrocarbons, such as isoamylenes or butadienes, are obtained from hydroxy or polyhydroxy compounds, such as isoamyl alcohol, 1,3-butylene glycol and the like when the said hydroxy compounds are treated with agents which split off water. Many of these reactions are endothermic or so slightly exothermic that a supply of heat is necessary for carrying them out. Accordingly the hydroxy compound is led in the vapor phase, either alone or in admixture with inert gases or vapors, at elevated temperatures over catalysts, the reaction products being separated from water split off by fractional cooling, allowing to settle and the like. In most cases, however, the yield per unit of space and time is very small so that when working on an industrial scale large amounts of catalyst must be employed.

We have now found that the said process is carried out with much smaller amounts of catalyst and in many cases more uniform reaction products are obtained by arranging the catalysts rigidly on the source of heat and not filling them into the catalytic chamber in the form of pieces as hitherto. The heating may be effected in any suitable manner as for example by hot gases or vapors, hot liquids or melts, or electrically. The catalysts may be arranged on the outside or inside of the walls of heated tubes or on heating elements of other construction the surface of which is preferably enlarged by means of ribs or the like. Ribbed tubes, somewhat of the shape of the usual pipes used for heating by means of hot water or steam, are especially suitable because the transfer of heat at their large surface is very uniform so that a crumbling off of the catalyst is avoided to a great extent.

The catalysts may be arranged on the heating surface, for example by being made into a paste, which is sprayed or otherwise coated on the said surface, or into which the said surface is dipped. It is advantageous to etch or otherwise roughen the said heating surface prior to the application of the catalyst.

The hydroxy compounds may be employed either alone or in admixture with inert gases or vapors. The compounds to be converted may be evaporated before entry into the catalytic chamber and the vapors superheated, or the two said operations may be carried out within the catalytic chamber. The dehydration may be carried out at atmospheric, reduced or increased pressure, preferably at a pressure between 2 and 20 atmospheres, for example at about 10 atmospheres, and at temperatures between 250° and 300° C., preferably between 270° and 280° C. When it is possible to split off more than 1 molecule of water, the operation may be carried out in one stage or the final product may be arrived at in several stages.

In addition to the catalytic preparation of unsaturated hydrocarbons from hydroxy or polyhydroxy compounds, the present invention may be applied to other catalytic dehydrations of organic compounds containing hydroxyl groups which may proceed endothermically while splitting off water or which may require the supply of heat, as for example the preparation of oxides from glycols, of esters from alcohols and acids, of anhydrides from acids and the like.

The efficiency with a given amount of catalysts according to the present invention is frequently ten or more times as good as with the processes hitherto known.

The following examples will further illustrate the nature of this invention, but the invention is not restricted to these examples. The parts are by weight.

Example 1

1,3-butylene glycol is led in the vapor phase into a cylindrical vessel which is heated to from 270° to 280° C. by means of a ribbed tube capable of being heated internally. From 800 to 900 cubic centimeters of a catalyst consisting of monosodium phosphate and red phosphorus are applied onto the ribbed tube in a layer of 6 millimeters thickness. With an hourly throughput of about 400 grams of 1,3-butylene glycol, 58 per cent are converted into butadiene, 24.7 per cent are recovered as butylene glycol and the remainder consists mainly of compounds which may be further converted into butadiene by splitting off water. The throughput of initial material per unit of time is 3.4 times as great as in a comparative experiment in which the same amount of catalyst is employed in a granular form loosely shaken into an externally heated catalytic furnace. Yet the yield of butadiene in the first case is 139 grams and in the comparative experiment 52.5 grams per hour.

Example 2

If 570 cubic centimeters of the same catalyst are applied in a layer of 3 millimeters thickness onto the heating tube of the apparatus described in Example 1, and the 1,3-butylene glycol is subjected to the same conditions, 58.5 per cent of the 1,3-butylene glycol are converted into butadiene and 21.8 per cent are recovered as butylene glycol under otherwise identical conditions. The throughput is 5.2 times as great as in a comparative experiment carried out as already described, yet the yields of butadiene per hour are 140 and 28 grams respectively.

Example 3

240 cubic centimeters of the catalyst are applied on the heating tube in a layer 1.5 millimeters thick and 450 grams of 1,3-butylene glycol are passed through per hour. Under the said conditions 53.5 per cent of the butylene glycol are converted into butadiene and 16.5 per cent are recovered. The throughput per hour is 15 times as great as in the comparative apparatus. Yet the yields of butadiene per hour amount to 144 and 12 grams respectively.

Example 4

From 800 to 900 cubic centimeters of a catalyst consisting of 4 parts of aluminium hydroxide and 1 part of monosodium phosphate are applied as a layer 6 millimeters in thickness onto the heating tube of the apparatus described in Example 1. The heating temperature ranges between 350° and 375° C. 1000 grams of isoamyl alcohol are passed through per hour in the form of vapor whereby 80 per cent are converted into isoamylene, the unchanged remainder being recovered. The throughput is twice as great as in a comparative experiment carried out in the manner described in Example 1. Yet the yields of isoamylene per hour are 800 and 440 grams respectively.

Example 5

570 cubic centimeters of a catalyst consisting of 3 parts of monosodium phosphate and 1 part of zirconium oxide are applied onto the heating tube as a layer 3 millimeters in thickness of the apparatus described in Example 1. The heating temperature is 325° C. 198 grams of a mixture consisting of 1 molecular proportion of acetic acid and 3 molecular proportions of ethyl alcohol, is passed through per hour, whereby 70.4 grams of ester (corresponding to 80 per cent of the acid employed) are obtained. The unconverted acetic acid and ethyl alcohol may be recovered. The throughput is one and a half times as great as in a comparative experiment carried out as already described. Yet the yields of ester per hour amount to 70.4 grams and 50 grams respectively.

Example 6

650 cubic centimeters of a catalyst consisting of 4 parts of sodium meta-phosphate and 1 part of bauxite are applied as a layer 4 millimeters in thickness onto the heating tube of the apparatus described in Example 1. The heating temperature amounts to from 400° to 450° C. 250 grams of acetic acid are passed through per hour whereby 50 per cent are converted into acetic acid anhydride. The throughput is thrice as great as in a comparative experiment carried out as already described. Yet the yields per hour of acetic acid anhydride are 166.6 and 62 grams respectively.

What we claim is:—

1. A process for the production of butadiene by catalytic dehydration of 1,3-butylene glycol by the action of heat, which comprises heating said 1,3-butylene glycol to a temperature of between 270° and 280° C. in the presence of a dehydration catalyst in the form of a coherent layer on the source of heat.

2. A process for the production of butadiene by catalytic dehydration of 1,3-butylene glycol by the action of heat, which comprises heating said 1,3-butylene glycol to a temperature of between 270° and 280° C. in the presence of a dehydration catalyst consisting of monosodium phosphate and red phosphorous and which is in the form of a coherent layer on the source of heat.

3. A process for the production of butadiene by catalytic dehydration of 1,3-butylene glycol by the action of heat which comprises heating said 1,3-butylene glycol in the presence of a dehydration catalyst in the form of a coherent layer on the source of heat.

4. A process for the production of butadiene by catalytic dehydration of 1,3-butylene glycol by the action of heat which comprises heating said 1,3-butylene glycol to a temperature of between 250° and 300° C. in the presence of a dehydration catalyst in the form of a coherent layer on the source of heat.

5. A process for the production of butadiene by catalytic dehydration of 1,3-butylene glycol by the action of heat which comprises heating said 1,3-butylene glycol under a pressure of between 2 and 20 atmospheres to a temperature of between 250° and 300° C. in the presence of a dehydration catalyst in the form of a coherent layer on the source of heat.

MARTIN MUELLER-CUNRADI.
ERNST OBER.